US009304990B2

(12) United States Patent
Bank et al.

(10) Patent No.: US 9,304,990 B2
(45) Date of Patent: Apr. 5, 2016

(54) TRANSLATION OF TEXT INTO MULTIPLE LANGUAGES

(75) Inventors: Judith H. Bank, Morrisville, NC (US); Liam Harpur, Dublin (IE); Ruthie D. Lyle, Durham, NC (US); Patrick J. O'Sullivan, Dublin (IE); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 849 days.

(21) Appl. No.: 13/589,254

(22) Filed: Aug. 20, 2012

(65) Prior Publication Data
US 2014/0052434 A1    Feb. 20, 2014

(51) Int. Cl.
*G06F 17/28* (2006.01)
(52) U.S. Cl.
CPC ................................. *G06F 17/289* (2013.01)
(58) Field of Classification Search
CPC ... G06F 17/289; G06F 17/28; G06F 17/2872; G06F 17/275; G06F 9/4448; G06F 17/2827; G06F 17/2836; G06F 17/20; G06F 17/2735; G06F 17/30867; G06F 17/2881; G06F 17/2845
See application file for complete search history.

(56) References Cited

U.S. PATENT DOCUMENTS

| | | | | |
|---|---|---|---|---|
| 5,497,319 | A * | 3/1996 | Chong ................ | G06F 17/2264 704/10 |
| 6,374,239 | B1 * | 4/2002 | Anderson et al. ............ | 707/760 |
| 6,996,520 | B2 | 2/2006 | Levin | |
| 7,412,374 | B1 | 8/2008 | Seiler et al. | |
| 7,711,548 | B2 * | 5/2010 | Carroll et al. ..................... | 704/8 |
| 8,868,404 | B1 * | 10/2014 | Yancey ................... | G06F 17/28 704/7 |
| 8,924,194 | B2 * | 12/2014 | Bangalore ........................ | 704/2 |
| 2001/0029455 | A1 * | 10/2001 | Chin ..................... | G06F 17/273 704/277 |
| 2002/0198971 | A1 * | 12/2002 | Resnick ................ | G06F 9/4448 709/221 |
| 2004/0102956 | A1 * | 5/2004 | Levin ................................ | 704/2 |
| 2004/0102957 | A1 * | 5/2004 | Levin ................... | G06F 17/2735 704/3 |
| 2004/0199373 | A1 * | 10/2004 | Shieh ................................ | 704/2 |
| 2005/0055630 | A1 | 3/2005 | Scanlan | |
| 2008/0127091 | A1 * | 5/2008 | Ericsson et al. .............. | 717/123 |
| 2008/0244397 | A1 * | 10/2008 | Ferlitsch ................ | G06F 9/4448 715/703 |
| 2009/0094016 | A1 * | 4/2009 | Mao ................................. | 704/3 |
| 2011/0077933 | A1 * | 3/2011 | Miyamoto et al. ................ | 704/2 |
| 2011/0192895 | A1 | 8/2011 | Millan Marco | |
| 2012/0016655 | A1 * | 1/2012 | Travieso ............. | G06F 17/2827 704/2 |
| 2012/0016865 | A1 * | 1/2012 | Travieso ............. | G06F 17/2827 707/711 |
| 2012/0016929 | A1 * | 1/2012 | Travieso ............. | G06F 17/2827 709/203 |
| 2013/0262078 | A1 * | 10/2013 | Gleadall ................. | G06F 17/28 704/3 |

\* cited by examiner

*Primary Examiner* — Abdelali Serrou
(74) *Attorney, Agent, or Firm* — Convergent Law Group LLP

(57) ABSTRACT

Methods and systems for translating a text into multiple languages performed by at least one software component executed by at least one processor, comprise: maintaining a translation repository having a plurality of entries associating different types of content with user-specified languages; monitoring the text received by a program to identify one or more types of content and a source language of the text; retrieving the user-specified languages from the translation repository associated with the identified types of content; and for each of the identified types of content, translating the content thereof from the source language to the corresponding user-specified language when the source language is different from the corresponding user-specified language.

15 Claims, 2 Drawing Sheets

TRANSLATION OF TEXT INTO MULTIPLE LANGUAGES

BACKGROUND

Machine translation is a sub-field of computational linguistics in which software is used to translate text (or speech) from one natural language to another. In its basic form, machine translation systems perform simple substitution of words in one language for words in another, but more sophisticated systems may use corpus and statistical techniques for improved recognition of whole phrases. Examples of existing web-based translation systems include Google Translate and Bing Translator.

Conventional translators allow manual text translation and/or webpage translation. With text translation, the user must navigate to the webpage of the translator, select a translation language from a "Languages" drop down box, then type or paste text to be translated into an "Enter text or webpage" box, and then click a "Translate" button to activate the translation. With Web page translation, the user performs the same steps except the user enters a URL of a webpage in the "Enter text or webpage" box instead of text. In some systems, the original language of the text or webpage can be automatically detected by the translation software. Further, Google Translate offers a service where visitors to a webpage have the option to view a translated version of a website.

While the automatic translation of an entire text (or selection thereof) or an entire webpage may be valuable to users, existing systems fail to take into account user language preferences for different types of content when browsing the Internet or even within a website. Many multi-language users, for example, may prefer to read different types of content in different languages.

Accordingly, it would be desirable to provide automatic machine translation of a text into multiple languages

BRIEF SUMMARY

The exemplary embodiment provides methods and systems for translating a text into multiple languages. Aspects of exemplary embodiment include maintaining a translation repository having a plurality of entries associating different types of content with user-specified languages; monitoring the text received by a program to identify one or more types of content and a source language of the text; retrieving the user-specified languages from the translation repository associated with the identified types of content; and for each of the identified types of content, translating the content thereof from the source language to the corresponding user-specified language when the source language is different from the corresponding user-specified language.

According to the method and system disclosed herein, a single webpage or document may be automatically translated into multiple languages depending on types of content the page contains and the language preferences of the user.

DETAILED DESCRIPTION

The exemplary embodiment relates to automatic machine translation of a text into multiple languages. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

The exemplary embodiments provide automatic machine translation of a text into multiple languages. The system of the present invention understands over time the types of content a user would prefer to view in different languages and ensures that any such content is translated appropriately. Content subsequently accessed by the user is monitored to determine the type of content therein, and the content, such as a paragraph on a webpage or section of a word processing document, is then translated and displayed according to learned language preferences of the user. According to one aspect of the exemplary embodiment, a single webpage or document may be automatically translated into multiple languages depending on types of content the page contains and the language preferences configured for the user.

Figure 1:
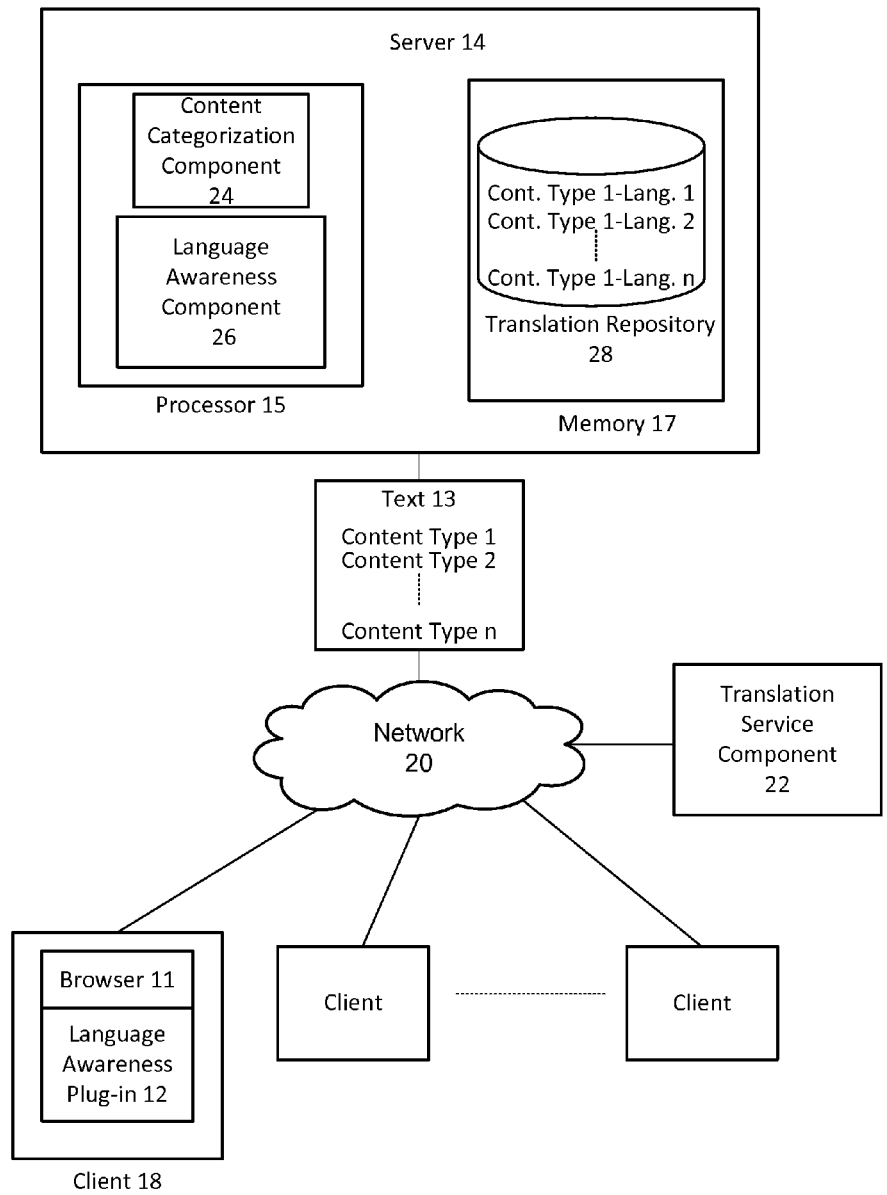
FIG. 1 is a diagram illustrating one embodiment of a machine translation system.

FIG. 1 is a diagram illustrating one embodiment of a machine translation system. In the embodiment shown, the machine translation system 10 comprises a client/server architecture where a server 14 communicates with user computers or clients 18 over a network 20, such as the Internet. Components of the server 14 may include a language awareness component 26, a content categorization component 24 and a translation repository 28. A language awareness plug-in 12 executing on the client 18 communicates with the language awareness component 26 on the server 14.

According to the exemplary embodiments, the language awareness plug-in and components 12 and 26 work together to analyze and automatically determine what language a text 13 being viewed on the client 18 should be translated into based on the types of content in the text 13 and predetermined user languages preferences stored in the translation repository 28.

In operation, past activity of the user of client 18 and/or manual input from the user are used by the language awareness component 26 to associate different types of content with different user-specified language preferences, and these associations or rules are stored in the translation repository 28. As the user of the client 18 browses the Internet using a program such as a browser 11 or opens a document in a program, the language awareness plug-in 12 on the client 18 may monitor user activity on the computer and the text 13 presented by the browser or other program. The monitored user activity and the text 13 may then be transferred to a language awareness component 26 running on the server 14 for analysis.

The language awareness component 26 may utilize the content categorization component 24 to automatically categorize the content in the text 13 into one or more types of content (e.g., content type 1 through content type n). In one embodiment, the language awareness component 26 may use any type of conventional content categorization software or service (e.g., IBM Classification Module). The language awareness component 26 then matches the identified types of content to the types of content stored in the translation repository 28 to determine which user-specified language the identified types of content in the text to be translated into. Once the user-specified language is identified, a conventional web-based translation service component 22 may be employed to automatically translate the different portions of the text into the user-specified languages. Examples of web-based information services include Google Translate and Bing Translator.

According to the exemplary embodiments, the system 10 may translate different portions of the text into different languages based on the different types of content detected in the text and the previously defined using language preferences. For example, assume that a user browsing the Internet is a native Finnish speaker who pulls up a webpage having English text and snippets of Java program. Assume further that the user has created language preferences in the translation repository 28 that specify programming languages should be displayed in English, while all other types of content are to be displayed in Finnish. Based on automatic categorization of the webpage contents and the user language preferences in the translation repository 28, the language awareness component 26 will selectively translate the webpage such that the Java program portions are left in English, while the non-programming portions of the webpage are translated into Finnish.

In one embodiment, the clients 18 may exist in various forms, including a personal computer (PC), a notebook, a tablet, a smart phone, a gaming platform, a set-top box, and the like. Both the server 14 and the clients 18 may include hardware components of typical computing devices, including at least one processor 15 and memory 17. Other components may include input devices (e.g., keyboard, pointing device, microphone for voice commands, buttons, touch screen, etc.), and output devices (e.g., a display device, and the like). The server 14 and the client devices 18 may also include wired or wireless network communication interfaces for communication. The server 14 and clients 18 may include computer-readable media, including the memory 17 and storage devices (e.g., flash memory, hard drive, optical disk drive, magnetic disk drive, and the like) containing computer instructions that implement the functionality disclosed when executed by the processor 15.

A data processing system suitable for storing and/or executing program code will include at least one processor 15 coupled directly or indirectly to elements of memory 17 through a system bus (not shown). The memory elements can include local memory employed during actual execution of the program code, bulk storage, and cache memories which provide temporary storage of at least some program code in order to reduce the number of times code must be retrieved from bulk storage during execution.

The input/output or I/O devices (including but not limited to keyboards, displays, pointing devices, etc.) can be coupled to the system either directly or through intervening I/O controllers (not shown). Network adapters may also be coupled to the system to enable the data processing system to become coupled to other data processing systems or remote printers or storage devices through intervening private or public networks. Modems, cable modems and Ethernet cards are just a few of the currently available types of network adapters.

In the embodiment shown, the translation service component 22 is located remote from the server 14, but in alternative embodiments could be located on the server 14. Although the server 14 is shown hosting the language awareness component 26 and the content categorization component 24, in an alternative embodiment, the language awareness component 26 and the content categorization component 24 may be run on any type of computer that has memory and processor, such as the clients 18, or the a smartphone. In addition, although the server 14 is shown as a single computer, it should be understood that the functions of server 14 may be distributed over more than one server, and the functionality of software components may be implemented using a different number of software components.

Figure 2:
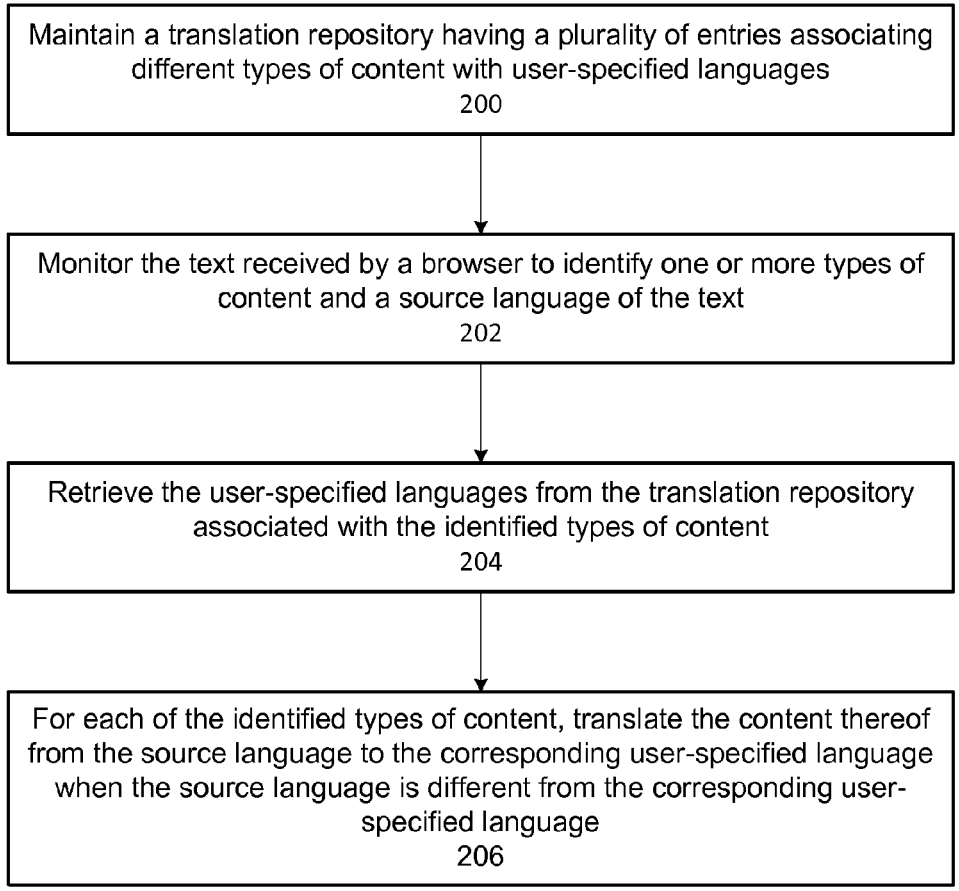
FIG. 2 is a flow diagram illustrating one embodiment of a machine translation process for translating a text into multiple languages.

FIG. 2 is a flow diagram illustrating one embodiment of a machine translation process for translating a text into multiple languages. In one embodiment, the process is performed by the language awareness component 26 unless otherwise indicated. As used herein, the term "text" may refer to any type of electronic document, webpage, email, message, selection of characters, or file.

The process may begin by the language awareness component 26 maintaining a translation repository 28 that has a plurality of entries associating different types of content with user-specified languages (block 200).

In one embodiment, the entries in the translation repository 28 may be created manually by the user or automatically by the system 10. Optionally, the language awareness component 26 may include a user interface for receiving manual input of the user's association of the types of content with user-specified languages, which are then stored in the translation repository 28. For example, the user may manage URL page browsing by creating a rule whereby some or all of the translation of the text may be invoked based on previous translation activity or activity in horizontal applications.

According to one embodiment, the language awareness component 26 may automatically create the entries by learning the language preferences of the user. In this embodiment, the language awareness component 26 monitors a history of browsing activity and user requests to translate text into user-specified languages. The language awareness component 26 determines the types of content in the text that the user requested to be translated, and then creates entries in the translation repository 28 that associate the determined types of content with the user-specified languages.

By continuously monitoring the browsing activity of the user and user requests to translate the texts into user-specified languages (or not to translate the texts), the system 10 may automatically learn the user's language preferences by creating new entries in the translation repository 28 when new translation patterns are detected in the user's activity. For example, the system 10 may learn based on previous user translation requests that the user has a preference that all social networking sites should be displayed in a specific language. Or the system 10 may notice that for all content viewed after 6 pm, the users typically requests that the language be changed to Finnish.

According to one embodiment, the language awareness component 26 may display a prompt requesting the user to confirm that the new translation pattern is correct and that the new pattern should be recorded in the translation repository 28 for future automatic translations. The following are example prompts that the language awareness component 26 may display to the user: "The system has noticed that when you read content related to physics you prefer to read in English. Would you like all such content to be left in English in the future?" Or "The system has noticed that when you read content sent from your manager, you prefer to read it in English. Do you want all such content to be left in English in the future?").

According to another aspect of the exemplary embodiment, the types of content associated with user-specified languages in the translation repository 28 may include: 1) data and topics/concepts detected in text material; 2) attributes of the text, such as an address (e.g., URL), a sender, or a recipient; 3) attributes of the user, such as user roles and modes; 4) attributes of the user's computer or client 18, such as operational modes, open programs, and time of day; and 5) monitored user activity, such as browsing history.

In one embodiment, the language awareness component 26 may be responsive to changes in monitored user activity (such as the user changing mode of operation/role to another user mode of operation/role), to automatically translate displayed text to another user-specified language as specified in the translation repository 28 when the source language of the text is different than the user-specified language.

In one embodiment, the translation repository 28 may be implemented as a table, a database, an array, a list or a file. Entries in the translation repository may include rules that include a Content Type field for listing content types in the form of content tags and/or uniform resource locators (URLs), and a Language Preference field for listing in which the type of language the content should be displayed. The Content Type field may also include optional search operators, which are terms that are used to narrow or broaden a search. Some common search operators are Boolean operators AND, OR, NOT.

Table I below shows an example of translation repository records/rules.

TABLE I

| Content Type | Language Preference |
| --- | --- |
| News<br>http://www.bbc.com/<br>http://edition.cnn.com/ http://news.sky.com/skynews/ | Finnish |
| Programming<br>http://www.javabeginner.com/<br>http://eclipsetutorial.sourceforge.net/totalbeginner.html | English |
| Social<br>www.facebook.com<br>www.google+.com | Finnish |
| Medieval History Or<br>Warrior And<br>Time-of-day=>6 pm | Spanish |

As a user interacts with the client 18, the language awareness plug-in and components 12 and 26 monitor the text received by a program, such as the browser 11, to identify one or more types of content and a source language of the text (block 202). As stated above, the language awareness component 26 may be configured to use existing analysis and typing systems, such as the content categorization component 24, to automatically categorize the content by creating content tags (e.g., "Medieval History" and "Warrior").

Once the types of content and a source language of the text are identified, the language awareness component 26 retrieves the user-specified languages from the translation repository 28 associated with the identified types of content (block 204). More specifically, the language awareness component 26 uses the identified types of content to find entries in the data repository having matching types of content and retrieves the correspond language.

For each of the identified types of content having matching entries in the translation repository 28, the language awareness component 26 translates the content thereof from the source language to the corresponding user-specified language when the source language is different from the corresponding user-specified language (block 206).

In one embodiment, when the awareness component 26 transfers the text from the identified types of content to the translation service component 22 along with an indication of the user-specified language in which to translate the content. The translation service component 22 then performs the translation and either sends the translated text to the language awareness component 26 or directly to the client 18 for display.

A method and system for translating the text into multiple languages has been disclosed. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A method for translating different portions of a single electronic text when viewed by a user into different languages, comprising:
    maintaining, by a server, a translation repository having a plurality of entries associating different types of content with user-specified languages, each of the entries comprising a first field for listing content types in a form of content tags and/or uniform resource locators (URLs) and search operators, and a second field for listing in which the type of language the corresponding content type should be displayed, wherein the types of content associated with the user-specified languages include:
    attributes of the text,
    attributes of a user, including roles,
    attributes of a user computer, including monitored user activity, open programs, time of day, and operational modes including a first operational mode; and
    wherein the translation repository further includes:
    a first entry associating a first type of content with a first user-specified language,
    a second entry associating a second type of content with a second user-specified language,
    a third entry associating a first operational mode with a third user-specified language;
    responsive to the server receiving, from the user computer, monitored user activity and the text displayed on the user computer by program executing on that computer, identifying one or more types of content and a source language of the text;
    responsive to the server identifying the first type of content in the text, retrieving the first user-specified language from the translation repository associated with the first type of content, and translating the first type of content into the first user-specified language;
    responsive to the server identifying the second type of content in the text, retrieving the second user-specified language from the translation repository associated with the second content, and translating the second type of content into the second user-specified language; and
    responsive to the server identifying a change in operational mode to the first operational mode, retrieving the third user-specified language from the transition repository associated with the first operational mode, and translating at least a portion of the text into the third user-specified language; and
    displaying the translated text according to the first, second, and third user-specified language.

2. The method of claim 1 wherein maintaining the translation repository further comprises the software component automatically learning language preferences of a user by:
    monitoring a history of browsing activity and a user request to translate text into one of the user-specified languages;
    determining the types of content in the text; and
    creating an entry in the translation repository associating the determined types of content with the user-specified language.

3. The method of claim 1 wherein maintaining the translation repository further comprises the software component receiving manual input of the user's association of the types of content with the user-specified languages.

4. The method of claim 1 wherein maintaining the translation repository further comprises the software component monitoring browsing activity of a user and user requests to translate texts into user-specified languages in order to automatically learn language preferences of the user by creating a new entry in the translation repository when a new translation pattern is detected.

5. The method of claim 4 further comprising the software component displaying a prompt requesting the user to confirm that the new translation pattern is correct and that the new translation pattern should be recorded in the translation repository for future automatic translations.

6. An executable software product stored on a non-transitory computer-readable medium containing program instructions for translating different portions of a single electronic text when viewed by user into different languages, the program instructions for:
    maintaining, by a server a translation repository having a plurality of entries associating different types of content with user-specified languages, each of the entries comprising a first field for listing content types in a form of content tags and/or uniform resource locators (URLs) and search operators, and a second field for listing in which the type of language the corresponding content type should be displayed,
    wherein the types of content associated with the user-specified languages include:
    attributes of the text,
    attributes of a user, including roles, attributes of a user computer, including monitored user activity, open programs, time of day, and operational modes including a first operational mode; and wherein the translation repository further includes:

a first entry associating a first type of content with a first user-specified language, a second entry associating a second type of content with a second user-specified language, a third entry associating a first operational mode with a third user-specified language;

responsive to the server receiving, from the user computer, monitored user activity and the text displayed on the user computer by program executing on that computer, identifying one or more types of content and a source language of the text;

responsive to the server identifying the first type of content in the text, retrieving the first user-specified languages from the translation repository associated with the first type of content, and translating the first type of content into the first user-specified language;

responsive to the server identifying the second type of content in the text, retrieving the second user-specified language from the translation repository associated with the second content, and translating the second type of content into the second user-specified language;

responsive to the server identifying a change in operational mode to the first operational mode, retrieving the third user-specified language from the transition repository associated with the first operational mode, and translating at least a portion of the text into the third user-specified language; and displaying the translated text according to the first, second, and third user-specified language.

7. The executable software product of claim 6 wherein the instructions for maintaining the translation repository further comprises program instructions for automatically learning language preferences of a user by:

monitoring a history of browsing activity and a user request to translate text into one of the user-specified languages;

determining the types of content in the text; and creating an entry in the translation repository associating the determined types of content with the user-specified language.

8. The executable software product of claim 6 wherein the instructions for maintaining the translation repository further comprises program instructions for receiving manual input of the user's association of the types of content with the user-specified languages.

9. The executable software product of claim 6 wherein the instructions for maintaining the translation repository further comprises program instructions for monitoring browsing activity of a user and user requests to translate texts into user-specified languages in order to automatically learn language preferences of the user by creating a new entry in the translation repository when a new translation pattern is detected.

10. The executable software product of claim 9 further comprising program instructions for displaying a prompt requesting the user to confirm that the new translation pattern is correct and that the new translation pattern should be recorded in the translation repository for future automatic translations.

11. A server for translating different portions of a single electronic text when viewed by user into different languages, comprising:

a memory;

a processor coupled to the memory; and a software component executed by the processor that is configured to:

maintain a translation repository having a plurality of entries associating different types of content with user-specified languages, each of the entries comprising a first field for listing content types in a form of content tags and/or uniform resource locators (URLs) and search operators, and a second field for listing in which the type of language the corresponding content type should be displayed, wherein the types of content associated with the user-specified languages include:

attributes of the text, attributes of a user, including roles, attributes of a user computer, including monitored user activity, open programs, time of day, and operational modes including a first operational mode; and wherein the translation repository further includes:

a first entry associating a first type of content with a first user-specified language, a second entry associating a second type of content with a second user-specified language, a third entry associating a first operational mode with a third user-specified language;

responsive to receiving, from the user computer, monitored user activity and the text displayed on the user computer by program executing on that computer, identify one or more types of content and a source language of the text;

responsive to the server identifying the first type of content in the text, retrieve the first user-specified language from the translation repository associated with the first type of content, and translating the first type of content into the first user-specified language;

responsive to the server identifying the second type of content in the text, retrieve the second user-specified language from the translation repository associated with the second content, and translate the second type of content into the second user-specified language; and responsive to the server identifying a change in operational mode to the first operational mode, retrieve the third user-specified language from the transition repository associated with the first operational mode, and translate at least a portion of the text into the third user-specified language; and displaying the translated text according to the first, second, and third user-specified language.

12. The system of claim 11 wherein the software component is further configured to automatically learn language preferences of a user, including:

monitor a history of browsing activity and a user request to translate text into one of the user-specified languages;

determine the types of content in the text; and create an entry in the translation repository associating the determined types of content with the user-specified language.

13. The system of claim 11 wherein the software component further configured to receive manual input of the user's association of the types of content with the user-specified languages.

14. The system of claim 11 wherein the software component further configured to monitor browsing activity of the user and user requests to translate texts into user-specified languages in order to automatically learn language preferences of a user by creating a new entry in the translation repository when a new translation pattern is detected.

15. The system of claim 14 wherein the software component further configured to display a prompt requesting the user to confirm that the new translation pattern is correct and that the new translation pattern should be recorded in the translation repository for future automatic translations.

\* \* \* \* \*